US008311964B1

(12) United States Patent
Efstathopoulos et al.

(10) Patent No.: US 8,311,964 B1
(45) Date of Patent: Nov. 13, 2012

(54) PROGRESSIVE SAMPLING FOR DEDUPLICATION INDEXING

(75) Inventors: Petros Efstathopoulos, Los Angeles, CA (US); Fanglu Guo, Los Angeles, CA (US); Dharmesh Shah, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 546 days.

(21) Appl. No.: 12/617,426

(22) Filed: Nov. 12, 2009

(51) Int. Cl.
*G06F 17/00* (2006.01)
*G06N 5/00* (2006.01)
(52) U.S. Cl. ........... 706/45; 707/791; 707/705; 711/113
(58) Field of Classification Search .................. 707/791; 711/113
See application file for complete search history.

(56) References Cited

U.S. PATENT DOCUMENTS

| 5,561,421 | A  | 10/1996 | Smith |
| 5,990,810 | A  | 11/1999 | Williams |
| 6,014,676 | A  | 1/2000 | McClain |
| 6,141,784 | A  | 10/2000 | Davis |
| 6,389,433 | B1 | 5/2002 | Bolosky et al. |
| 6,513,051 | B1 | 1/2003 | Bolosky et al. |
| 6,865,655 | B1 | 3/2005 | Andersen |
| 6,920,537 | B2 | 7/2005 | Ofek et al. |
| 6,983,365 | B1 | 1/2006 | Douceur et al. |
| 7,055,008 | B2 | 5/2006 | Niles |
| 7,136,976 | B2 | 11/2006 | Saika |
| 7,146,429 | B2 | 12/2006 | Michel |
| 7,200,604 | B2 | 4/2007 | Forman et al. |
| 7,213,158 | B2 | 5/2007 | Bantz et al. |
| 7,257,104 | B2 | 8/2007 | Shitama |
| 7,257,643 | B2 | 8/2007 | Mathew |
| 7,310,644 | B2 | 12/2007 | Adya et al. |
| 7,318,072 | B2 | 1/2008 | Margolus |
| 7,359,920 | B1 | 4/2008 | Rybicki et al. |
| 7,389,394 | B1 | 6/2008 | Karr |
| 7,401,194 | B2 | 7/2008 | Jewell |
| 7,409,523 | B2 | 8/2008 | Pudipeddi |
| 7,424,514 | B2 | 9/2008 | Noble et al. |
| 7,454,592 | B1 | 11/2008 | Shah |

(Continued)

OTHER PUBLICATIONS

U.S. Appl. No. 11/404,105 entitled Routing, filed Apr. 13, 2006, all pages.

(Continued)

*Primary Examiner* — Kakali Chaki
*Assistant Examiner* — Kalpana Bharadwaj
(74) *Attorney, Agent, or Firm* — Rory D. Rankin; Meyertons, Hood, Kivlin, Kowert & Goetzel, P.C.

(57) ABSTRACT

A system and method for efficiently reducing a number of duplicate blocks of stored data. A file server both removes duplicate data and prevents duplicate data from being stored in the shared storage. A sampling rate may be used to determine which fingerprints, or hash values, are stored in an index. The sampling rate may be modified in response to changes in characteristics of the system, such as a change in the shared storage size, a change in a utilization of the shared storage, a change in the size of the storage unit, and reaching a threshold corresponding to utilization of the index. Also, a small cache may be maintained for holding fingerprint and pointer pair values prefetched from the shared storage. Each prefetched pair may be associated with data corresponding to a previous hit in the index. The association may be related to spatial locality, temporal locality, or otherwise.

20 Claims, 6 Drawing Sheets

U.S. PATENT DOCUMENTS

| | | | |
|---|---|---|---|
| 7,478,113 B1 | 1/2009 | De Spiegeleer et al. | |
| 8,166,012 B2 * | 4/2012 | Reddy et al. | 707/705 |
| 2001/0045962 A1 | 11/2001 | Lee | |
| 2002/0107877 A1 | 8/2002 | Whiting et al. | |
| 2004/0044707 A1 | 3/2004 | Richard | |
| 2004/0143731 A1 | 7/2004 | Audebert et al. | |
| 2005/0027766 A1 | 2/2005 | Ben | |
| 2005/0198328 A1 | 9/2005 | Lee et al. | |
| 2005/0204108 A1 | 9/2005 | Ofek | |
| 2005/0216813 A1 | 9/2005 | Cutts et al. | |
| 2006/0026219 A1 | 2/2006 | Orenstein et al. | |
| 2007/0198659 A1 | 8/2007 | Lam | |
| 2007/0250674 A1 | 10/2007 | Fineberg et al. | |
| 2008/0005141 A1 * | 1/2008 | Zheng et al. | 707/101 |
| 2008/0133561 A1 | 6/2008 | Dubnicki et al. | |
| 2008/0154989 A1 | 6/2008 | Arman | |
| 2008/0243769 A1 | 10/2008 | Arbour et al. | |
| 2008/0243953 A1 | 10/2008 | Wu et al. | |
| 2008/0244204 A1 | 10/2008 | Cremelie et al. | |
| 2010/0257403 A1 | 10/2010 | Virk et al. | |
| 2010/0274982 A1 | 10/2010 | Mehr et al. | |

OTHER PUBLICATIONS

U.S. Appl. No. 11/403,379 entitled Parallel Backup, filed Apr. 13, 2006, all pages.

U.S. Appl. No. 11/641,389, filed Dec. 18, 2006 entitled "Single Instance Storage", all pages.

* cited by examiner

Sampling Rate Modifications 400

Table 410

| DETECTED EVENT | MODIFICATION DESCRIPTION |
|---|---|
| Disk Storage Size increases/decreases | Sampling rate decreases/increases |
| Index Memory Size increases/decreases | Sampling rate increases/decreases |
| Portion size of Disk Storage increases/ decreases | Sampling rate decreases/increases |
| . . . | . . . |
| Utilization of Index Memory reaches a threshold | Sampling rate decreases |
| Available Storage > N AND Available Index < M | Sampling Rate = N * (X – Y) |

FIG. 4

PROGRESSIVE SAMPLING FOR DEDUPLICATION INDEXING

BACKGROUND OF THE INVENTION

1. Field of the Invention

This invention relates to computer systems and, more particularly, to efficiently reducing a number of duplicate blocks of data stored on a server.

2. Description of the Related Art

Computer systems frequently include data storage subsystems for storing data. In particular, computer systems that include multiple clients interconnected by a network increasingly share one or more data storage subsystems via a network. The shared storage may include or be further coupled to storage consisting of one or more disk storage devices, tape drives, or other storage media. Shared storage of modern computer systems typically holds a large amount of data. Efficient storage of this large amount of data may be desired in order for a modern business to effectively execute various processes.

One method of efficiently storing data includes data deduplication, which attempts to reduce the storage of redundant data. A deduplication software application may both remove duplicate data already stored in shared storage and disallow duplicate data from being stored in shared storage. Then only one copy of unique data may be stored, which reduces the required shared storage capacity.

Indexing of all data in the computing system may be retained should the redundant data ever be required. For example, data may be partitioned and a hash computation may be performed for each partition using any of several known hashing techniques. A corresponding hash value, or fingerprint, of data associated with a write request to the shared storage may be compared to fingerprints of data already stored in the shared storage. A match may invoke the deduplication application to discard the data of the write request, locate the already stored copy in shared storage, and create a reference or pointer to the existing stored data.

The comparisons of fingerprints may utilize a storage of fingerprints, such as in a random access memory (RAM) or otherwise. Upon arrival of data partitions of a write request to the shared storage, a fingerprint is calculated for a data partition and compared to the fingerprints stored in the RAM or other storage. This RAM or other storage may be referred to as a fingerprint index, or index. One design issue is maintaining an index capable of storing fingerprints of all data partitions known to be stored in the shared storage. Since a computer system's storage capacity is typically very large, an index may need to be very large also and the index may not fit in the supplied RAM or other storage. If a portion of the associated fingerprints is stored in the shared storage itself, such as a disk storage, performance may suffer. The disk access speeds may not fast enough to keep up with the rate of index requests.

In view of the above, systems and methods for efficiently reducing a number of duplicate blocks of data stored on a server are desired.

SUMMARY OF THE INVENTION

Various embodiments of a computer system and methods for efficiently reducing a number of duplicate blocks of data stored on a server are disclosed. In one embodiment, client devices are coupled to a shared storage via a file server. The file server comprises deduplication software application that may be configured to remove duplicate data already stored in the shared storage. Also, the application may be configured to prevent duplicate data from being stored in the shared storage. In order to maintain both deduplication efficiency and shared storage scalability, a sampling rate may be used to determine which data segment fingerprints are stored in an index memory. In various embodiments, a data segment may corresponds to a single storage unit. In other embodiments, a data segment may comprise less than, or more than, a single storage unit. Numerous such alternatives are possible and all are contemplated. In one embodiment, the sampling rate is set such that only 1 out of every N blocks of data written to the storage system has its fingerprint stored in the index memory. The index memory may be used to store metadata associated with data segments stored in the shared storage. In one embodiment, the metadata for each segment comprises a pair of values such as a fingerprint value derived from a hash algorithm and a pointer value that identifies a location of a corresponding data copy in the shared storage. In one embodiment, the index stores metadata for only a subset of data blocks stored in the storage subsystem. In various embodiments, the sampling rate may be modified in response to changes in characteristics of the system.

In addition, in various embodiments a cache may be maintained for holding fingerprint and pointer pair values prefetched from the shared storage. Each prefetched pair may be associated with data corresponding to a hit in the index memory. Since this stored data which hit in the index memory is currently being backed up or stored again, associated data may also be accessed. The association may be related to spatial locality, temporal locality, or otherwise. For associated non-sampled data, the cache may provide a higher probability of a query hit and accordingly provide both a faster access. Additionally, the cache may serve to prevent non-sampled, but unique, data from being stored again.

These and other embodiments will become apparent upon consideration of the following description and accompanying drawings.

BRIEF DESCRIPTION OF THE DRAWINGS

FIG. 4 is a generalized block diagram illustrating a table of sampling rate modifications.

Figure 1:
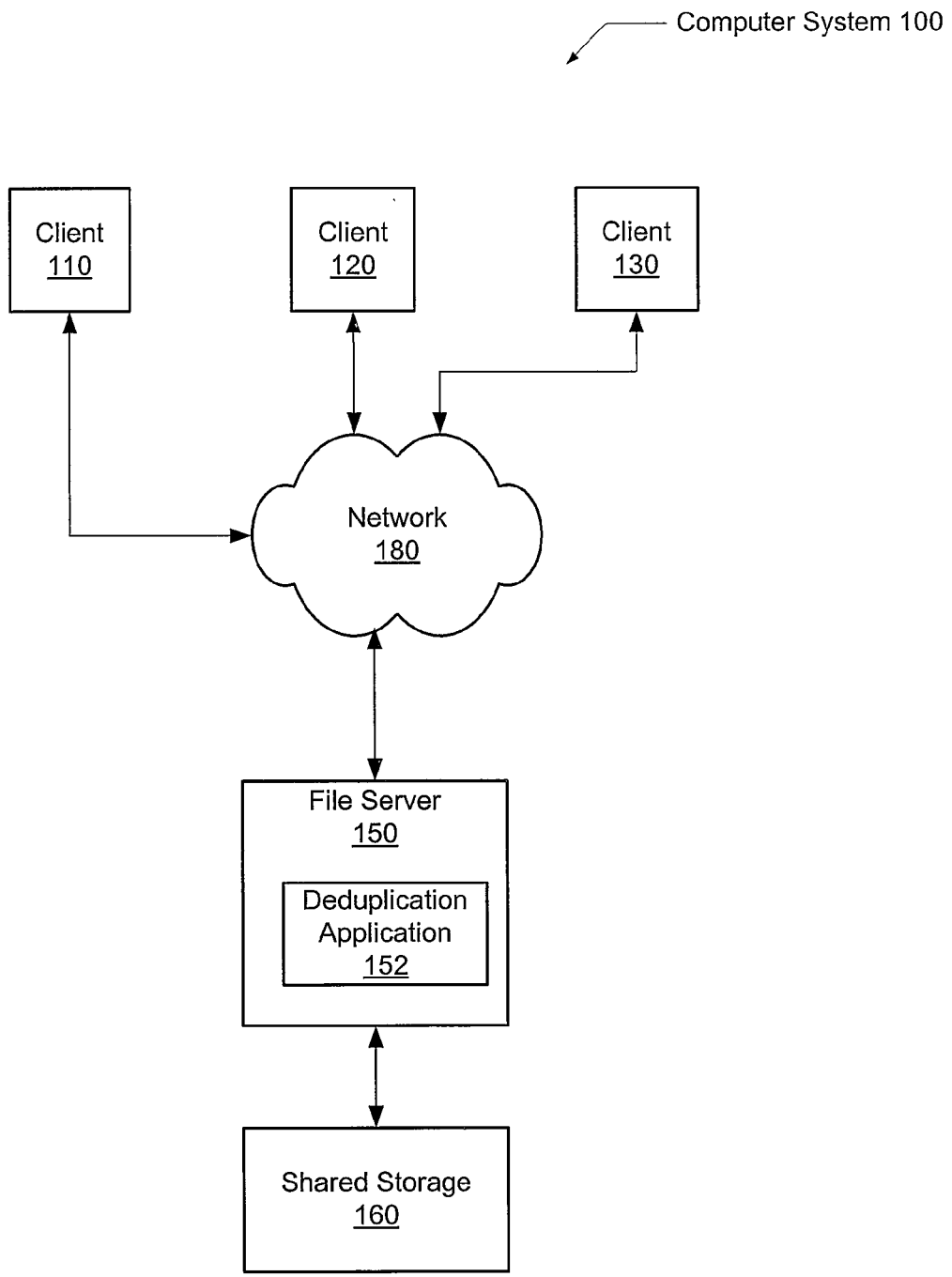
FIG. 1 is a generalized block diagram illustrating one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

FIG. 1 illustrates one embodiment of a computer system 100. As shown, system 100 includes clients 110, 120, and 130 interconnected through a network 180 to one another and to a file server 150 comprising a deduplication software application 152. Disk storage 160 is coupled to file server 150. Clients 110, 120, and 130 are representative of any number of stationary or mobile computers such as desktop PCs, workstations, laptops, handheld computers, blade servers, etc. Clients 110-130 may execute software applications that utilize computer files corresponding to photographic or other still images, documents, video streams, audio files, or any other kind of data. Although system 100 is described as including client and servers, in alternative embodiments the functions performed by clients and servers may be performed by peers in a peer-to-peer configuration or by a combination of clients, servers, and peers.

In alternative embodiments, the number and type of clients, servers, and storage devices is not limited to those shown in FIG. 1. Almost any number and combination of servers, desktop, and mobile clients may be interconnected in system 100 via various combinations of modem banks, direct LAN connections, wireless connections, WAN links, etc. Also, at various times one or more clients may operate offline. In addition, during operation, individual client connection types may change as mobile users travel from place to place connecting, disconnecting, and reconnecting to system 100.

Within system 100, it may be desired to store data associated with any of clients 110, 120, and 130 within shared storage 160. The shared storage 160 may include or be further coupled to storage consisting of one or more hard disks, tape drives, server blades, or specialized devices, and may include a variety of memory devices such as RAM, Flash RAM, MEMS (MicroElectroMechanical Systems) storage, battery-backed RAM, and/or non-volatile RAM (NVRAM), etc.

File server 150 may be configured to provide a location for the shared storage of computer files that comprise data that can be accessed by clients 110-130. Metadata describing the layout of data stored in shared storage 160 may be stored in file server 150. A client may retrieve metadata from file server 150 in order to identify a desired data storage location within shared storage 160. In alternative embodiments, the functions of data location may be performed by any of a variety of components such as a volume configuration daemon or other storage management processes or servers depending on the type and layout of storage devices in shared storage 160.

File server 150 may include a deduplication application 152 configured to reduce the amount of redundant data stored in shared storage 160. When an application being executed on a client performs a store of a file, this file may be transferred to file server 150 through network 180. The deduplication application 152 may verify that data components of the file are unique. Verified unique data components of the file may be stored in shared storage 160. Data components of the file verified to be redundant data components may be reference to a corresponding copy already stored in shared storage 160.

Characteristics of the system may result in an inefficient verification process wherein it may be unknown if data components of the file are unique or redundant. In this case, the data components may be treated as unique and stored in shared storage 160, although another copy may already be stored. Examples of characteristics of the system that may lead to this inefficiency may include at least the size of the shared storage 160, the relative portion of shared storage 160 that is used, the size of an index storing fingerprints relative to data stored in shared storage 160, and the amount of current utilization of the index.

Figure 2:
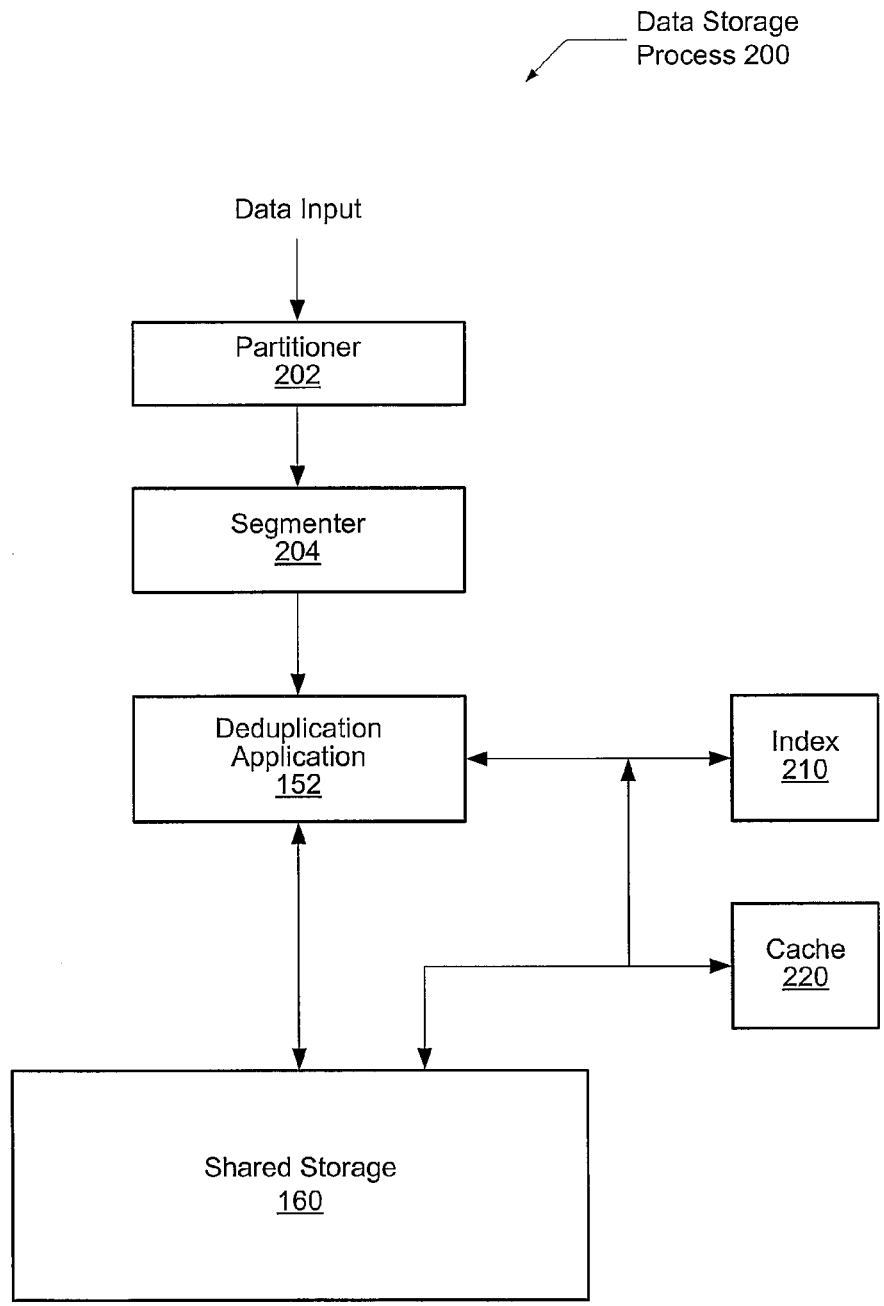
FIG. 2 is a generalized block diagram illustrating one embodiment of a data storage process.

Turning now to FIG. 2, one embodiment of a data storage process 200 is shown. Data corresponding to a computer file to be stored from a client may be partitioned. The data may be stored in units of a given size that may depend on the capacity of individual storage device locations. These units may be data objects, data portions, chunks, or any other partition of data suited to the individual storage devices. In one embodiment, for a client backup process, a backup deduplication process performs a partitioning of the data and performs hash calculations on the client itself. Units of data that have same hash values as units of data already stored in shared storage 160 are not sent from the client. Rather, the shared storage 160 may be notified and create a pointer that references the stored copy. Therefore, by not sending the partitioned data, network traffic load may be reduced.

In another embodiment, for in-line deduplication, the deduplication application 152 on file server 150 performs a partitioning of the data, performs hash calculations to generate fingerprints, and performs comparisons of fingerprint values as data arrives to the file server 150 via network 180 as shown in FIG. 1. In yet another embodiment, for out-of-line deduplication, the data is first accumulated in an on-disk holding area within shared storage 160 and later the steps of partitioning, calculating hashes, and comparing fingerprints are performed. However, an on-disk holding area large enough to hold an entire backup window's worth of raw data may substantially diminish storage capacity within shares storage 160.

Although the functions of data processing may be described as occurring by deduplication application 152 residing within file server 150, and may typically occur here as data arrives to file server 150, it is noted the functionality may be performed in other locations if convenient. Additionally, deduplication application 152 may reside elsewhere. For example, deduplication application 152 may reside in storage 160, in a proxy coupled between the clients and storage, etc. Also, deduplication application 152 is described as one software application performing the steps for efficient deduplication. However, deduplication application 152 may include several smaller components and libraries and links to other programs to perform these steps. For simplicity, deduplication application 152 is shown as one entity.

The data sent from a client may be a data stream, such as a byte stream, received by partitioner 202. In one embodiment, segments are the data units of a given size used for storage in and retrieval from shared storage 160. As is well known to those skilled in the art, a segment is a sequence of chunks. Data streams may be divided into segments in a two-step process. First, in one embodiment, the data stream may be divided into a sequence of variable-length chunks using content-based chunk boundaries, wherein the division is performed by a chunking algorithm within partitioner 202. A chunk is a sub-file content-addressable unit of data. A table may be used to map file types to a most appropriate chunking method. A file's type may be determined by referring to its file name extension.

Second, the resulting chunk sequence corresponding to a computer file may be broken into a sequence of segments using a segmenting algorithm within segmenter 204. Segments may be represented by a data structure that allows reconstruction of a segment from its chunks. The chunks later may be stored separately in one or more chunk containers in shared storage 160 to allow for sharing of chunks between segments. A segment's data structure may record its corresponding sequence of chunks including an associated calculated hash value, a pointer to its location on disk or other media within shared storage 160, and its length. Every stored segment may have such a data structure stored on disk or other media within shared storage 160.

For each segment produced by segmenter 204, the deduplication application 152 may calculate a corresponding hash value, or fingerprint. For example, a cryptographic hash function, such as Message-Digest algorithm 5 (MD5), Secure Hash Algorithm (SHA), or other, may be used to calculate a corresponding fingerprint. In order to know if a received given segment is already stored in shared storage 160, the calculated fingerprint for the given segment may be compared to fingerprints of segments stored in shared storage 160. For example, index 210 may store a table that maps a segment's fingerprint to a pointer indicating a location of where the associated segment is stored in shared storage 160. If index 210 has the capacity, it may store a fingerprint and pointer pair for each segment already stored in shared storage 160. Then the calculated fingerprint for the received given segment may be used to query, or access, index 210 for comparisons to be made. If the query results in a hit, or matches a fingerprint already stored in index 210, then it may be known that the given segment is already stored in shared storage 160. Otherwise, if the query results in a miss, or there is no match found in index 210, then it may be assumed the given segment is not redundant and it is to be stored in shared storage 160. A corresponding fingerprint and pointer pair may be stored in index 210.

In one embodiment, index 210 comprises random-access-memory (RAM). Index 210 may not have the storage capacity to hold a fingerprint and pointer pair for each corresponding segment already stored in shared storage 160. For example, a system may include 16 GB of RAM for index 210, may use 8 KB for a segment size based on a predetermined segmenting algorithm, and may use 24 bytes per entry of index 210 based on a predetermined hash function and pointer size. Such a system may only support 5.3 TB (e.g. 8 KB×16 GB/24 B) within shared storage 160. This supported value may be extremely low for modern standards.

Alternatively, for a system with 100 TB of capacity within shared storage 160 and the same segment and index entry sizes of 8 KB and 24 B, respectively, the system has 12.5E09 fingerprints (e.g. 100 TB/8 KB) to maintain. Then the index 210 would have a size of 300 GB (e.g. 12.5E09×24 B), which is an impractical RAM size for modern designs.

Therefore, each segment stored in shared storage 160 may not have a corresponding fingerprint and pointer pair stored in index 210. Rather, a selection process may be used to determine which segments are to have corresponding entries in index 210 while maintaining a reasonable scalability supporting the capacity in shared storage 160. For example, one out of every N incoming segments to be potentially stored, may be selected, or sampled, for allocating an entry in the index 210. Therefore, a segment corresponding to a received write request has an index entry allocated if both there was no corresponding query hit to the index and the segment corresponds to an Nth received segment. Now the amount of memory, or RAM, utilized by the index 210 may be decreased for fixed values of shared storage capacity, segment size, and index entry size. It is noted that for purposes of discussion, the sampling rate may be expressed herein in terms of data blocks or segments. For example, the sampling rate may be expressed as 1 out of every N data blocks received (e.g., via write requests) for storage in the storage system. However, in other embodiments, the sampling rate may be applied on the basis of different or multiple entities. For example, in an alternative embodiment, sampling could be applied on the basis of write requests (e.g., 1 out of N write requests). Alternatively, sampling could be applied on the basis of multiple entities. For example, sampling could be on the basis of double words or double blocks (e.g., 1 out of every N double words; or 1 out of every N double blocks). Numerous such alternatives are possible and are contemplated. As used herein, a "block", "segment", or "chunk" may refer to one or more bits of data for which a fingerprint may be generated and sampled as an identifiable entity. The identifiable entity may correspond to a single storage unit, less than a single storage unit, or more than a single storage unit in the storage system.

In one embodiment, a basic sampling rate may use the following formula, $$R=(S*M)/(E*C),$$

Wherein R is the sampling rate, or 1 fingerprint chosen out of every N fingerprints; E is the number of bytes per index entry, C is the storage capacity of the shared storage, S is the segment size, and M is the index size. It is noted there is a one-to-one correspondence between received write request to segment and segment to fingerprint. Therefore, the sampling rate may be described in terms of any of these terms.

This sampling rate may be progressive, since any of the variables may change. For example, more capacity may be added to shared storage 160. In such a case, if the capacity increases, or the shared storage size increases, then the sampling rate may decrease to provide improved coverage of the new size of the shared storage. Therefore, the value of N increases. For example, an initial sampling rate may be calculated by the above formula to be 1/10, or 1 out of every 10 fingerprints is selected to be stored in the index 210. If the capacity of shared storage 160 doubles, the sampling rate may be halved, and the value of N may double. Now the modified sampling rate may be 1/20.

In one embodiment, this modification may occur in response to the change in size of the capacity. For example, a monitor for detecting a change in the size of the shared storage 160 may be placed within deduplication application 152. Alternatively, an application programming interface (API) may be used to access a monitor placed outside of application 152. In another embodiment, the modification of the sampling rate may be in response to both the change in shared storage size and to a detection that a time interval has elapsed. For example, a periodic time interval may be used to determine if and when to alter the sampling rate. For example, more capacity may be added to the shared storage 160 at a time t1, but the sampling rate may not change until a time interval is reached at time t2, wherein t2>t1.

Also, although rare, the hash function, the chunking algorithm, and the segmenting algorithm may change over time, which would result in changes in other variables in the above formula. Again, a modification of the sampling rate as a result of any of these changes may not occur until a time interval is reached. Further still, the sampling rate may be recomputed in response to the utilization of either the shared storage 160, the index 210, or both. For example, in one embodiment, the sampling rate may be based on the amount of storage that is actually being used. For instance, although file server 150 may have 100 TB attached to it, only 10 TB may be used since it was deployed. Effectively, this is a 10 TB server and the system may benefit from using a lot more samples for such a low usage of the provided capacity. Therefore, the 10 TB value may be used in the above formula, rather than the 100 TB value. Similarly, when the utilization of the index 210 reaches a predetermined threshold, such as 70% of the RAM in one example, the sampling rate may be modified using the remaining 30% value in the above formula.

In one embodiment, an initial sample rate may be set to 1, or each segment is selected for storing a corresponding fingerprint and pointer value in the index 210. Then the sample rate may be modified later. For example, a predetermined threshold value corresponding to utilization of the shared storage 160 and/or the index 210 may be used to indicate a one-to-one correspondence between index entries and stored segments is not able to be maintained. As the amount of used storage in both the shared storage 160 and the index 210 increases, the threshold value may be reached and indicate that the sampling rate should be modified. As more and more storage is used, a modified sampling rate may be calculated and the system resamples accordingly.

The effect of a progressive sampling rate on deduplication efficiency may be improved by also implementing prefetching techniques. When a calculated fingerprint of a current store request hits in the index memory 210, or matches a fingerprint already stored, a prefetch of fingerprint values associated with the currently calculated fingerprint may be performed from the shared storage 160 to a relatively small cache 220. The associated fingerprint values from the shared storage may be associated due to spatial locality, temporal locality, or otherwise. Subsequent store requests, which are highly likely to be non-sampled, may have corresponding fingerprint values calculated that are very likely to hit in the small cache 220.

Figure 3:
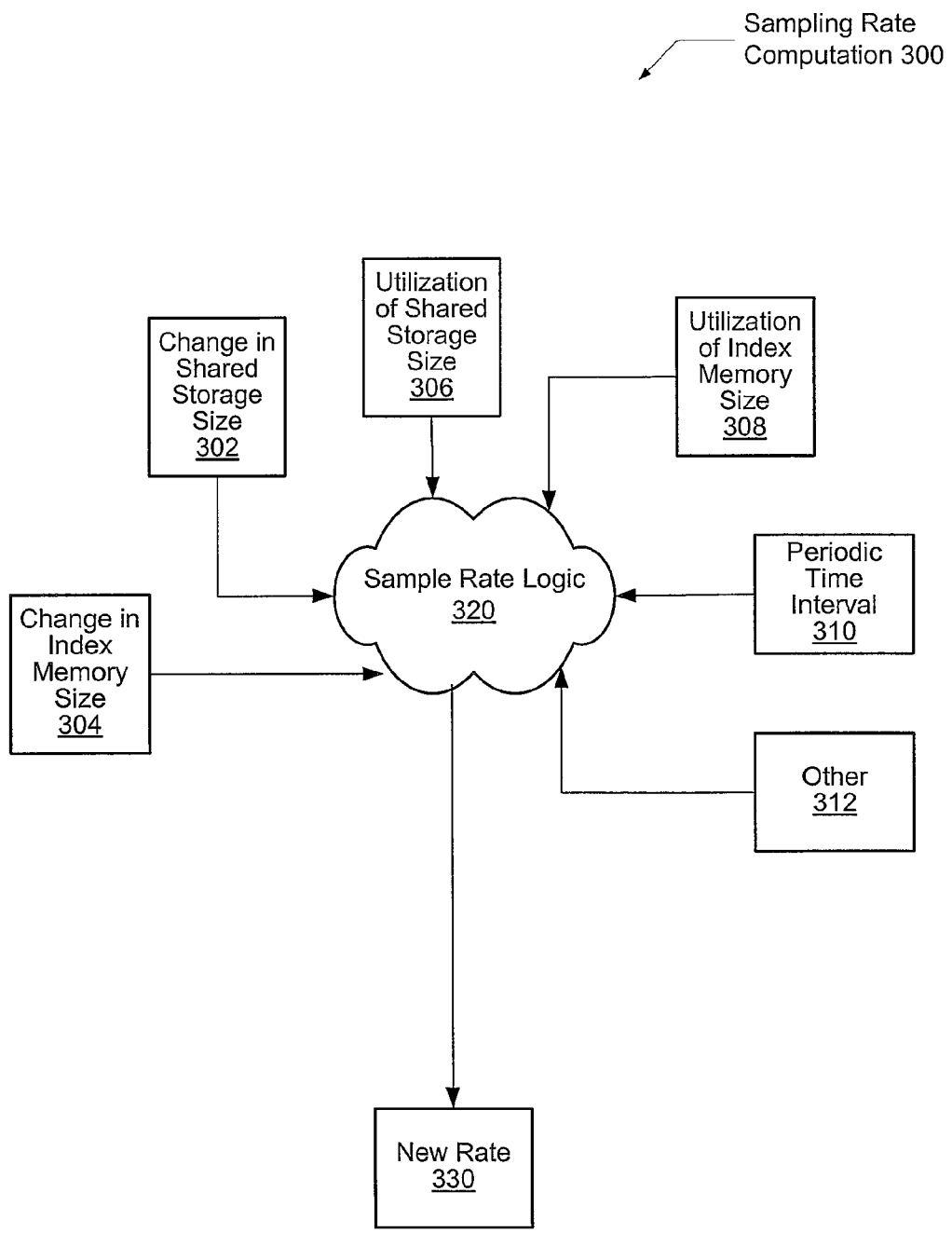
FIG. 3 is a generalized block diagram illustrating one embodiment of a sampling rate computation.

Referring now to FIG. 3, one embodiment of sampling rate computation 300 is shown. An initial sampling rate may be set to 1, computed with the formula provided above, or computed with a modified version of the above formula that adds new variables, adjusts the above variables, such as estimating a usage percentage of the given total capacities, or otherwise. As write requests are received from clients to store data, different inputs may be monitored or detected in order to determine a new or modified sampling rate 330. For example, sample rate logic 320, which may comprise any suitable combination of software and/or hardware, may receive a plurality of inputs. An example includes a change in the shared storage size 302, which may be a disk storage size. Other examples include a change in the index memory size 304, utilization of the shared storage size 306, utilization of the index memory 308, a periodic time interval 310, or other 312. In response to these inputs, the new rate logic 320 may compute a new sampling rate 330. This progressive sampling rate may provide better deduplication results as responses are made to changes to the characteristics of the system.

In another embodiment, shared storage 160 may be partitioned wherein each partition corresponds to a different file type of different applications (e.g. video streams, text documents) or to a different business division within an organization (e.g. finance, engineering design development, human resources). Likewise, the index 210 may have corresponding partitions. Each partition may have a separate sample rate. Each separate sample rate may be dependent upon a size of the partitions within the shared storage 160 and index memory 210, a change in sizes of the partitions, and utilization of the partitions. Each partition may have its own new rate logic 320.

In yet another embodiment, the storing of data may correspond to one of these usage partitions based upon file type, business division, or other and a single sampling rate is adjusted accordingly. The variables, or inputs 302-312, may change based on a current usage partition. For example, a threshold value corresponding to the utilization of the index memory may be different depending on the usage partition. Also, a factor of increase or decrease for the sampling rate may be altered depending on the usage partition. The index memory may be cleared when a detected switch is made from one usage partition to another unrelated usage partition, such as switching from engineering development at the end of a month to finance at the beginning of a month.

Turning now to FIG. 4, one embodiment of sampling rate modifications 400 is shown. Table 410 illustrates one example of modifications that may be made to the sampling rate in response to detected events. For example, as disk storage size within shared storage 160 increases, the sampling rate may decrease in order to account for potentially more stored segments. As utilization of the index memory reaches a predetermined threshold, the sampling rate may decrease to slow down the filling up of the entries. A factor value may be associated with these events and placed in the table. Also, a separate table may exist for different usage partitions described above.

As shown in the last row of the table in FIG. 4, conditions and results may be specified in any of a variety of ways. For example, the last row shows a condition expressed as a Boolean expression of two conditions. In the example shown, the test condition comprises both Available Storage>N, and Available Index<M. If both of these conditions are true, then the resulting Sampling Rate is set equal to $N*(X-Y)$, where X and Y may be any desired values or variables determined by the user or system administrator. In the example, the variables N, M, X, and Y are simply depicted to illustrate the flexibility the mechanism provides is setting a sampling rate. With knowledge of the hardware and software utilized by the system, values for each of the variables (e.g., X and Y) may be selected in a manner which optimizes system performance. In various embodiments, the table 410 is stored and maintained by the deduplication application. However, in other embodiments, table 410 may be separately maintained. Further, the events and/or modifications indicated by table 410 may be dynamically updated during system operation. Numerous such alternatives are possible and are contemplated.

Figure 5:
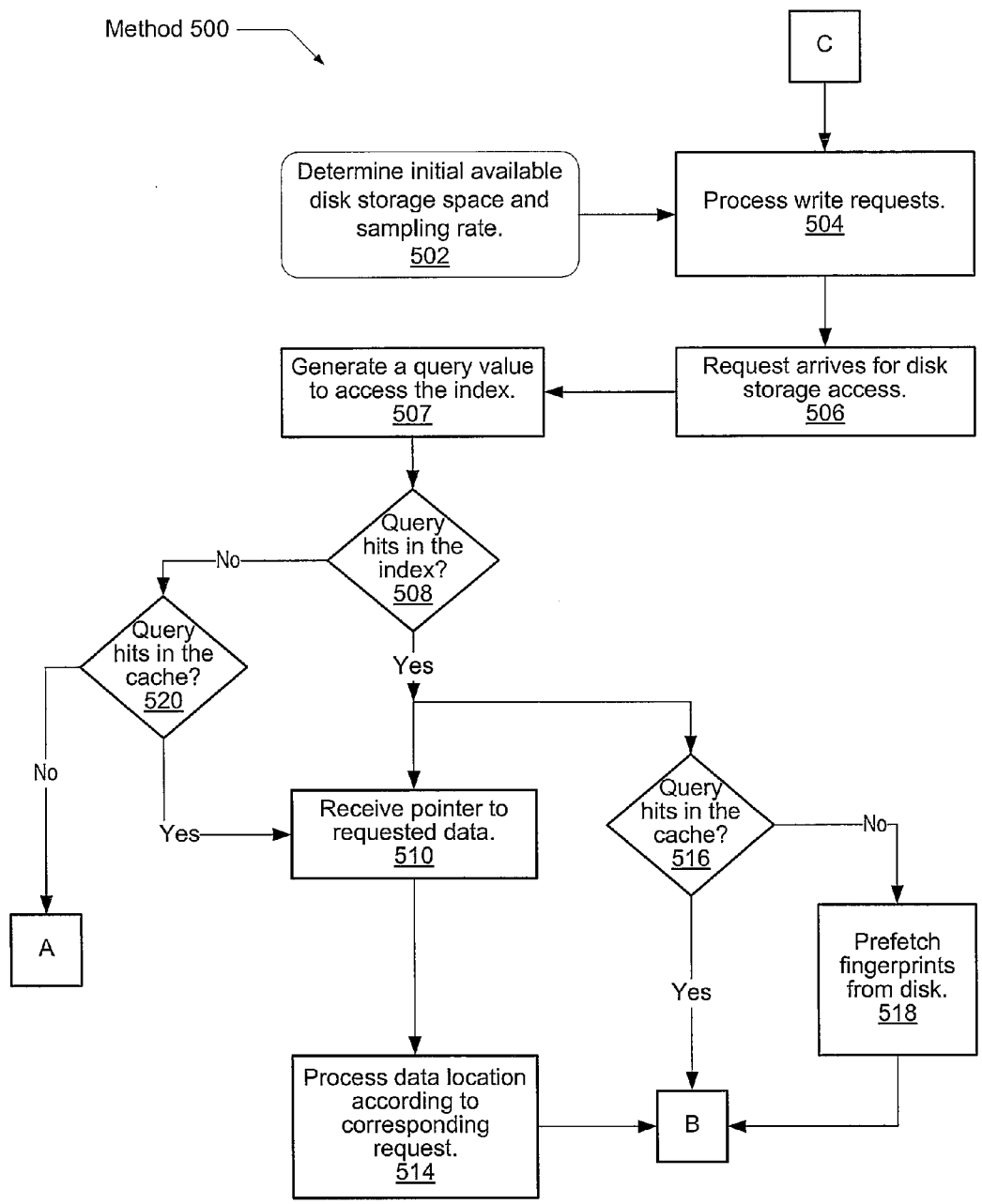
FIG. 5 is a generalized flow diagram illustrating one embodiment of a method for efficiently reducing a number of duplicate blocks of stored data.

Referring now to FIG. 5, one embodiment of a method 500 for efficiently reducing a number of duplicate blocks of data stored on a server is shown. The components embodied in the computer system 100 and data storage process 200 described above may generally operate in accordance with method 500. For purposes of discussion, the steps in this embodiment are shown in sequential order. However, some steps may occur in a different order than shown, some steps may be performed concurrently, some steps may be combined with other steps, and some steps may be absent in another embodiment.

A computer system may comprise shared storage, such as a disk storage, coupled to a client. A file server coupled to the shared storage may receive store requests from the client and determine if the corresponding data is redundant data. In block 502, logic within the file server may determine the initial available disk storage of the shared storage. Alternatively, the file server may determine the initial available capacity of a partition of the shared storage allocated for a particular use. The particular use may correspond to a particular file type, business division, or otherwise. Other initial values may be detected or determined in order to set an initial sampling rate. Alternatively, the initial sampling rate may be simply set to 1.

Store, or write, requests are conveyed from the client to the file server in block 504, and these requests arrive via a network in block 506. In block 507, a query value is generated. In one embodiment, the query value may comprise a fingerprint generated using a cryptographic hash function. This fingerprint/hash value may be generated after the data has been divided into chunks and one or more segments have been formed with the chunks. If the query into an index memory results in a hit (conditional block 508), then the generated fingerprint matches a fingerprint value in the index memory indicating that the corresponding segment is redundant.

A corresponding pointer to the fingerprint is stored as part of a pair in an entry of the index memory. In block 510, this pointer value may be accessed. The pointer value may indicate or reference the data storage location of the corresponding segment in the shared storage. In block 514, the request may be simply discarded since a copy of the segment already exists in the shared storage. If a backup process is being performed, then the copy of the segment used to query the index memory may be removed from the shared storage. Then control flow of method 500 moves to block B.

At the same time of the query to the index memory, a query may be performed to the small cache holding prefetched fingerprint values associated with a previous hit in the index memory. If the query to the cache is a hit (conditional block 516), then control flow of method 500 moves to block B. Otherwise, in block 518, fingerprint values may be prefetched from the shared storage. These prefetched fingerprints may be associated with the fingerprint that hit in the index memory. The association may be due to spatial locality, temporal locality, or otherwise. Then control flow of method 500 moves to block B.

If the query into an index memory results in a miss (conditional block 508), then the generated fingerprint does not match a fingerprint value in the index memory indicating that the corresponding segment may be unique. The miss also may indicate the corresponding segment is redundant, but it has not been sampled yet. If a query with the same fingerprint value to the cache is a miss (conditional block 520), then control flow of method 500 moves to block A. Otherwise, control flow of method 500 moves to block 510.

Figure 6:
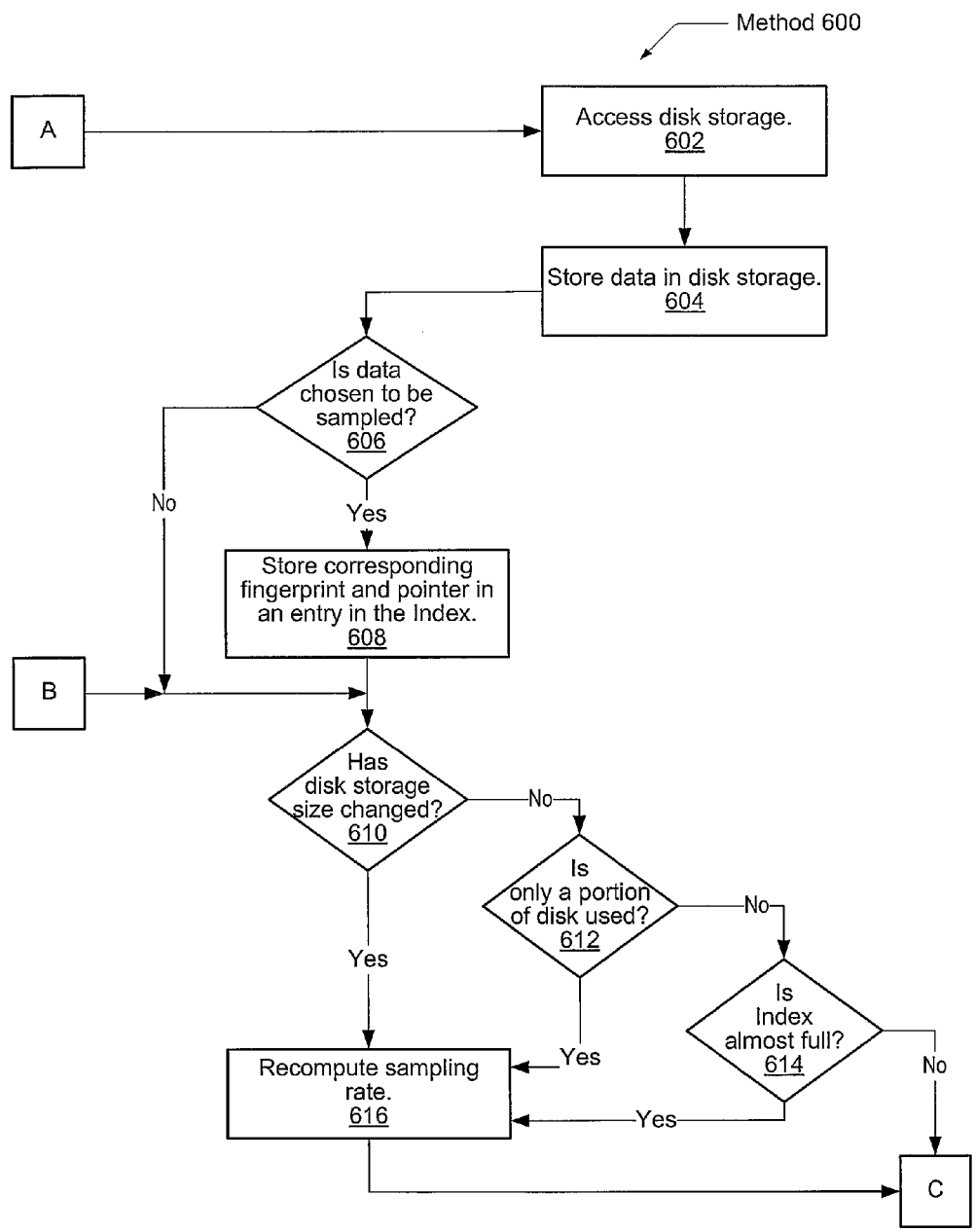
FIG. 6 is a generalized flow diagram illustrating one embodiment of a method for continuing efficiently reducing a number of duplicate blocks of stored data.

Turning now to FIG. 6, one embodiment of a method 600 for continuing efficiently reducing a number of duplicate blocks of stored data is shown. Similar to the above method described herein, the steps in this embodiment are shown in sequential order. However, some steps may occur in a different order than shown, some steps may be performed concurrently, some steps may be combined with other steps, and some steps may be absent in another embodiment.

In order to arrive at block A, a current calculated fingerprint missed in both the index memory and the small cache storing prefetched fingerprints. The shared storage is accessed in block 602 and the segment corresponding to the current calculated fingerprint is store in the shared storage in block 604. If this segment is selected to have an index entry allocated (conditional block 606), then in block 608, a fingerprint and pointer pair corresponding to the segment is stored in the index memory.

In order to arrive at block B, a current calculated fingerprint hit in the index memory. As shown in both FIG. 3 and FIG. 4, several conditions or events may cause a sampling rate to be modified. Decision blocks 610-614 illustrate a subset of these conditions. If any of these conditions are true, the sampling rate may be modified in block 616. Then control flow of method 600 moves to block C, where write requests are being processed in block 504 of method 500.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
a file server comprising an index memory; and
a storage subsystem coupled to the file server;
wherein the file server is configured to:
determine an initial sample rate for sampling fingerprints of data blocks written to the storage subsystem, wherein the initial sample rate corresponds to one out of every N data blocks;
store information in the index memory, wherein the information corresponds to sampled fingerprints; and
modify the initial sample rate to a modified sample rate that corresponds to one out of every M fingerprints of data blocks written to the storage subsystem, in response to detecting a change in characteristics of the system, wherein M is different from N.

2. The system as recited in claim 1, wherein a change in characteristics of the system includes at least one of the following: a change in a size of the storage subsystem, a change in utilization of the storage subsystem, a change in a size of data blocks written to the storage subsystem, reaching a predetermined threshold corresponding to utilization of the memory index, and reaching a predetermined time interval.

3. The system as recited in claim 2, wherein the file server is further configured to set M to be greater than N in response to at least one of the following: a size of the storage subsystem has increased, utilization of the storage subsystem has increased, and utilization of the memory index has reached the predetermined threshold.

4. The system as recited in claim 2, wherein the file server is further configured to set M to be less than N, in response to at least one of the following: a size of the storage subsystem has decreased, and utilization of the storage subsystem has decreased.

5. The system as recited in claim 2, wherein N is 1 for the initial sample rate.

6. The system as recited in claim 1, wherein the file server is further configured to prefetch information from the storage subsystem that corresponds to sampled fingerprints, in response to accessing information stored in the index memory, wherein the prefetched information is associated with the accessed information.

7. The system as recited in claim 6, wherein the file server is further configured to store the prefetched information in a cache, wherein the cache is accessed in response to access misses to the index memory.

8. The system as recited in claim 2, wherein the information stored in the index comprises at least one of the following: a fingerprint, and a pointer to a location within the storage subsystem holding a corresponding data block.

9. A computer implemented method comprising:
   determining an initial sample rate for sampling fingerprints of data blocks written to a storage subsystem coupled to a file server, wherein the initial sample rate corresponds to one out of every N data blocks;
   storing information in an index memory in the file server, wherein the information corresponds to sampled fingerprints; and
   modifying the initial sample rate to a modified sample rate that corresponds to one out of every M fingerprints of data blocks written to the storage subsystem, in response to detecting a change in characteristics of a computing system, wherein M is different from N.

10. The method as recited in claim 9, wherein a change in characteristics of the computing system includes at least one of the following: a change in a size of the storage subsystem, a change in utilization of the storage subsystem, a change in a size of data blocks written to the storage subsystem, reaching a predetermined threshold corresponding to utilization of the memory index, and reaching a predetermined time interval.

11. The method as recited in claim 10, further comprising setting M to be greater than N in response to at least one of the following: a size of the storage subsystem has increased, utilization of the storage subsystem has increased, and utilization of the memory index has reached the predetermined threshold.

12. The method as recited in claim 10, further comprising setting M to be less than N, in response to at least one of the following: a size of the storage subsystem has decreased, and utilization of the storage subsystem has decreased.

13. The method as recited in claim 9, further comprising determining an initial sample rate comprises setting N to a value proportional to a size of the index memory and inversely proportional to an entry size within the index memory.

14. The method as recited in claim 9, further comprising prefetching information from the storage subsystem that corresponds to sampled fingerprints, in response to accessing information stored in the index memory, wherein the prefetched information is associated with the accessed information.

15. The method as recited in claim 14, further comprising storing the prefetched information in a cache, wherein the cache is accessed in response to access misses to the index memory.

16. The method as recited in claim 10, wherein the information stored in the index memory comprises at least one of the following: a fingerprint, and a pointer to a location within the storage subsystem holding a corresponding segment.

17. A non-transitory computer-readable storage medium storing program instructions that are executable to:
    determine an initial sample rate for sampling fingerprints of data blocks written to a storage subsystem coupled to a file server, wherein the initial sample rate corresponds to one out of every N data blocks;
    store information in an index memory in the file server, wherein the information corresponds to sampled fingerprints; and
    modify the initial sample rate to a modified sample rate that corresponds to one out of every M fingerprints of data blocks written to the storage subsystem, in response to detecting a change in characteristics of a computing system, wherein M is different from N.

18. The computer-readable storage medium as recited in claim 17, wherein a change in characteristics of the computing system includes at least one of the following: a change in a size of the storage subsystem, a change in utilization of the storage subsystem, a change in a size of data blocks written to the storage subsystem, reaching a predetermined threshold corresponding to utilization of the memory index, and reaching a predetermined time interval.

19. The computer-readable storage medium as recited in claim 17, wherein the program instructions are further executable to prefetch information from the storage subsystem that corresponds to sampled fingerprints, in response to accessing information stored in the index memory, wherein the prefetched information is associated with the accessed information.

20. The computer-readable storage medium as recited in claim 19, wherein the program instructions are further executable to store the prefetched information in a cache, wherein the cache is accessed in response to access misses to the index memory.

* * * * *